United States Patent [19]
Takahashi

[11] Patent Number: 5,636,143
[45] Date of Patent: Jun. 3, 1997

[54] METHOD AND APPARATUS FOR ESTIMATING COLOR TEMPERATURE, PHOTOGRAPHING APPARATUS, AND METHOD AND APPARATUS FOR DETERMINING EXPOSURE

[75] Inventor: Koji Takahashi, Kanagawa, Japan

[73] Assignee: Fuji Photo Film Co., Ltd., Minami-ashigara, Japan

[21] Appl. No.: 542,376

[22] Filed: Oct. 13, 1995

[30] Foreign Application Priority Data

Oct. 19, 1994 [JP] Japan .................................. 6-253656

[51] Int. Cl.$^6$ .................................................. G01J 1/00
[52] U.S. Cl. ........................... 364/526; 364/525; 355/32; 355/35; 355/77; 355/30; 396/97; 396/225; 396/231
[58] Field of Search .................................. 364/526, 525; 356/402, 404, 405; 348/223, 655; 250/226, 228; 355/32, 35, 36, 38, 77, 37, 30; 354/430; 358/516; 396/97, 225, 231

[56] References Cited

U.S. PATENT DOCUMENTS

| | | | |
|---|---|---|---|
| 4,648,051 | 3/1987 | Wandell et al. | 364/526 |
| 4,992,963 | 2/1991 | Funt et al. | 364/526 |
| 5,168,303 | 12/1992 | Ikenoue et al. | 355/38 |
| 5,521,708 | 5/1996 | Beretta | 356/402 |

Primary Examiner—Emanuel T. Voeltz
Assistant Examiner—Hal D. Wachsman
Attorney, Agent, or Firm—Burns, Doane, Swecker & Mathis, LLP

[57] ABSTRACT

There are provided a method and apparatus capable of estimating a color temperature of a photographic light source. A theoretical reference value is obtained which is represented by summation or integration of the product of a spectral energy distribution of an object having a known color temperature, a spectral sensitivity distribution of a photometric system, and a spectral reflectance distribution defined by a certain expression. An actual value is acquired by measuring at least a portion of light reflected from a body which is exposed to light emitted from a light source whose color temperature is to be estimated. Spectral reflectance distributions are calculated for a plurality of color temperatures such that the difference between the theoretical reference value and the actual value becomes minimum. A calculation is performed to obtain the sum of abnormal components of the obtained spectral reflectance distribution whose maximum values exceed 1.0 as an evaluation value for each of the plurality of color temperatures. A color temperature is estimated which corresponds to the minimum value of the evaluation value as the color temperature of the light source whose color temperature is to be estimated.

20 Claims, 15 Drawing Sheets

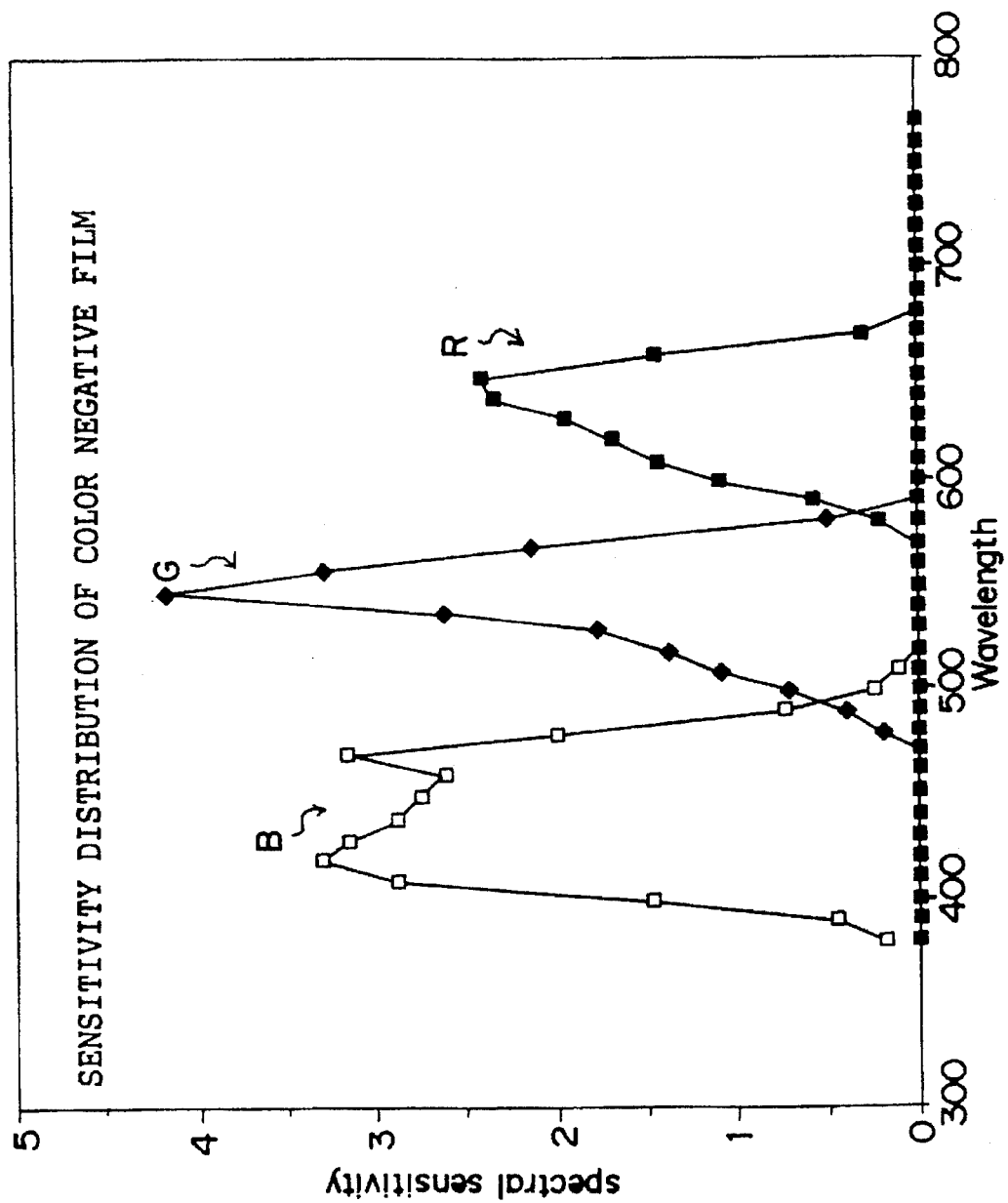

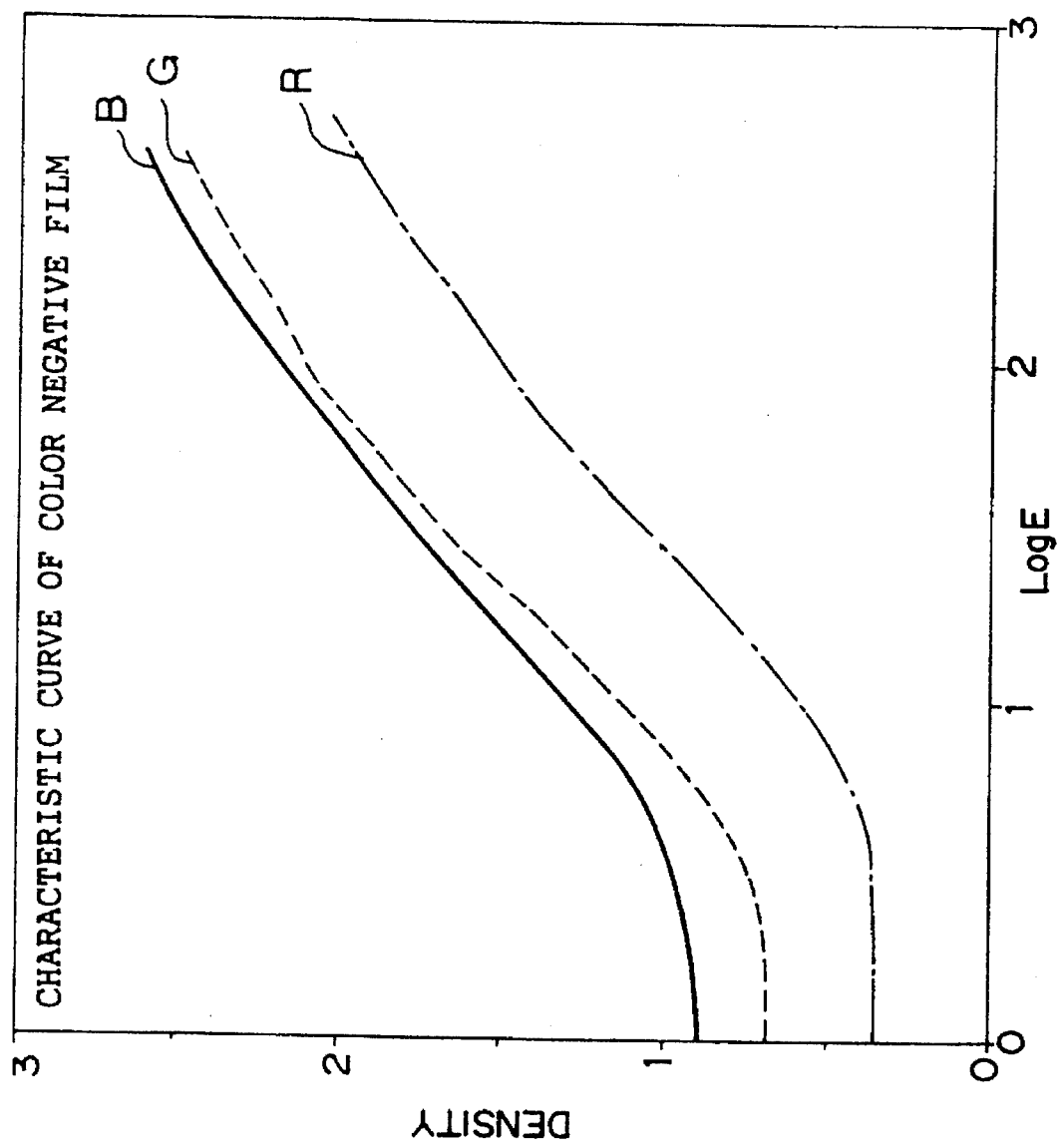

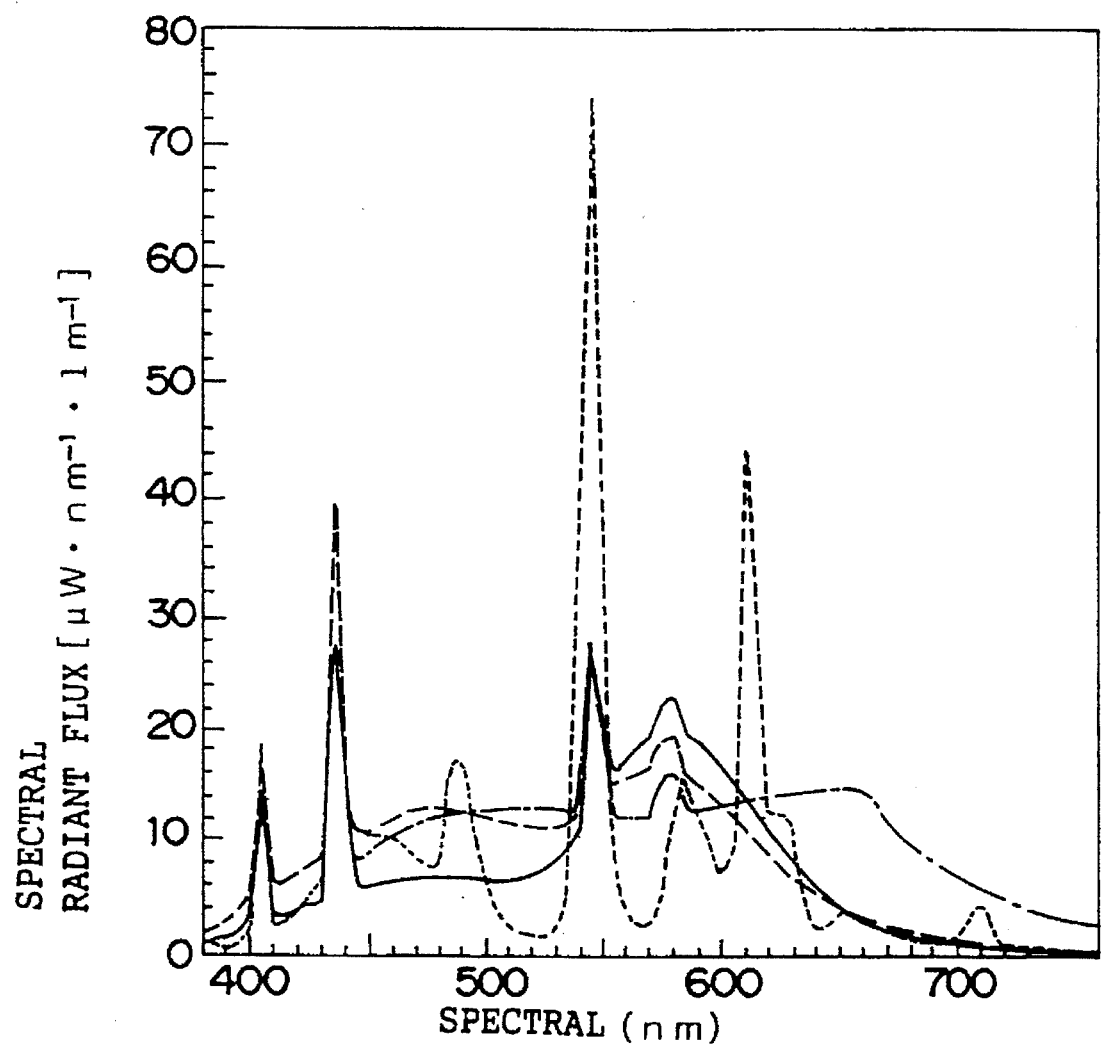

OUTPUT VALUE $Eb = Eg = Er = 0.7$

METHOD AND APPARATUS FOR ESTIMATING COLOR TEMPERATURE, PHOTOGRAPHING APPARATUS, AND METHOD AND APPARATUS FOR DETERMINING EXPOSURE

BACKGROUND OF THE INVENTION

1. Field of the Invention

The present invention relates to a color temperature estimating apparatus, a color temperature estimating method, a photographing apparatus, an exposure amount determining method, and an exposure amount determining apparatus. Particularly, the present invention relates to a method and apparatus for estimating a color temperature of a light source whose color temperature is to be estimated, a photographing apparatus using the method and apparatus for estimating a color temperature, and a method and apparatus for determining an exposure amount when an image on a photographic film is printed on a photosensitive material using the estimated color temperature.

2. Description of the Related Art

The amount of printing exposure required when a film image is printed on photosensitive materials such as photographic paper is determined according to the quantity of light received by the film from the subject at the time when the subject was photographed, and the amount of printing exposure differs from frame to frame. To obtain a print with a superior color reproductivity, it is necessary to correct a printing exposure depending on photographing conditions. To this end, as regards an exposure required when a color image is reproduced on a photosensitive material from an original color picture, a gray balance is determined by determining an integral transmission density for each of red light (R), green light (G), and blue light (B) using a photometer, which is provided with color separation filters made of dye filters or vapor deposition filters.

However, information on photographic light quality may vary depending on color failure in backgrounds or development conditions. This makes it impossible to accurately estimate light quality, and hence the color reproductivity may become poor depending on variations in the quality of light illuminating a subject. This is because judgment cannot be made as to which portions are gray on the photographic film.

The most effective method for detecting a gray portion on the photographic film is to estimate the color temperature of a photographic light source.

However, in order to estimate a color temperature of the photographic light source from the photographic film, it is necessary to separate a spectral reflection distribution of the subject and a spectral energy distribution of the photographic light source from exposure data (data obtained by converting a color development dye density into an exposure through a characteristic curve) which are recorded on the film.

Assuming that a spectral energy distribution of a photographic light source is P(λ), a spectral sensitivity distribution of a film is S(λ), and a spectral reflectance distribution of a subject is q(λ), exposure data E can be represented by the following expression (1):

$$E = \int P(\lambda) q(\lambda) S(\lambda) d\lambda \quad (1)$$

However, the spectral reflectance distribution of the subject varies every time of photographing, and hence the spectral reflectance distribution cannot be specified. For this reason, it is difficult to estimate the color temperature of the photographic light source from the photographic film.

For example, assuming that, as shown in FIG. 11A, the shapes of the spectral sensitivity distributions of the three sensitive layers are the same, and the spectral energy distribution of a photographic light source appears to be flat, even if $E_r = E_g = E_b = 0.7$ can be obtained as exposure data, it is impossible to obtain the spectral reflection distribution of the photographic light source as one distribution, as shown in FIGS. 11B and 11C.

SUMMARY OF THE INVENTION

The object of the present invention is to provide a method and apparatus for estimating the color temperature of a photographic light source.

Another object of the present invention is to provide a photographing apparatus utilizing the color temperature estimating apparatus.

Still another object of the present invention is to provide a method and apparatus for determining an optimum exposure by estimating the color temperature of a photographic light source.

According to a first aspect of the present invention, an apparatus for estimating a color temperature of a photographic light source is provided.

According to a second aspect of the present invention, a method for estimating a color temperature of a photographic light source is provided.

In these apparatus and method for estimating a color temperature, a theoretical reference value is obtained, or is obtained and memorized, which is represented by summation or integration of the product of a spectral energy distribution of an object having a known color temperature, a spectral sensitivity distribution of a photometric system, and a spectral reflectance distribution defined by an expression. An actual value is then acquired by measuring at least a portion of light reflected from a body which is exposed to light emitted from a light source whose color temperature is to be estimated. Subsequently, spectral reflectance distributions are calculated for a plurality of color temperatures such that the difference between the theoretical reference value and the actual value becomes minimum. A calculation is then performed to obtain the sum of abnormal components of the obtained spectral reflectance distribution whose maximum values exceed 1.0, as an evaluation value, for each of the plurality of color temperatures. A color temperature is estimated which corresponds to the minimum value of the evaluation value as the color temperature of the light source whose color temperature is to be estimated.

According to a third aspect of the present invention, there is provided a photographing apparatus equipped with the above-described color temperature estimating apparatus.

According to a fourth aspect of the present invention, there is provided an exposure amount determining method which comprises, in addition to the steps of the above-described color temperature estimating method, the step of determining the amount of exposure used for printing a subject image on a photosensitive material based on an estimated color temperature and the above-mentioned photometric data such that the gray of an image to be printed on the photographic film becomes identical to the gray obtained at the estimated color temperature.

According to a fifth aspect of the present invention, there is provided an exposure amount determining apparatus which comprises, in addition to means or elements of the above-described color temperature estimating apparatus, means for determining an exposure used for printing a subject image on a photosensitive material based on an estimated color temperature and the above-mentioned photometric data such that the gray of an image to be printed on the photographic film becomes identical to the gray obtained at the estimated color temperature.

The color temperature estimating method and apparatus of the present invention make it possible to estimate the color temperature of a light source whose color temperature is to be estimated by use of at least a portion of reflected light from the light source.

Further, the exposure determining method and apparatus of the present invention makes it possible to determine an optimum exposure amount which provides excellent tints by estimating the color temperature of a photographic light source.

BRIEF DESCRIPTION OF THE DRAWINGS

FIG. 8 is a graph showing the spectral reflectance distribution of a color negative film;

FIG. 9 is a graph showing the density-exposure characteristic of the color negative film;

FIG. 10 is a graph showing the spectral energy distributions of a plurality of fluorescent lamps;

PREFERRED EMBODIMENTS OF THE INVENTION

Figure 1:
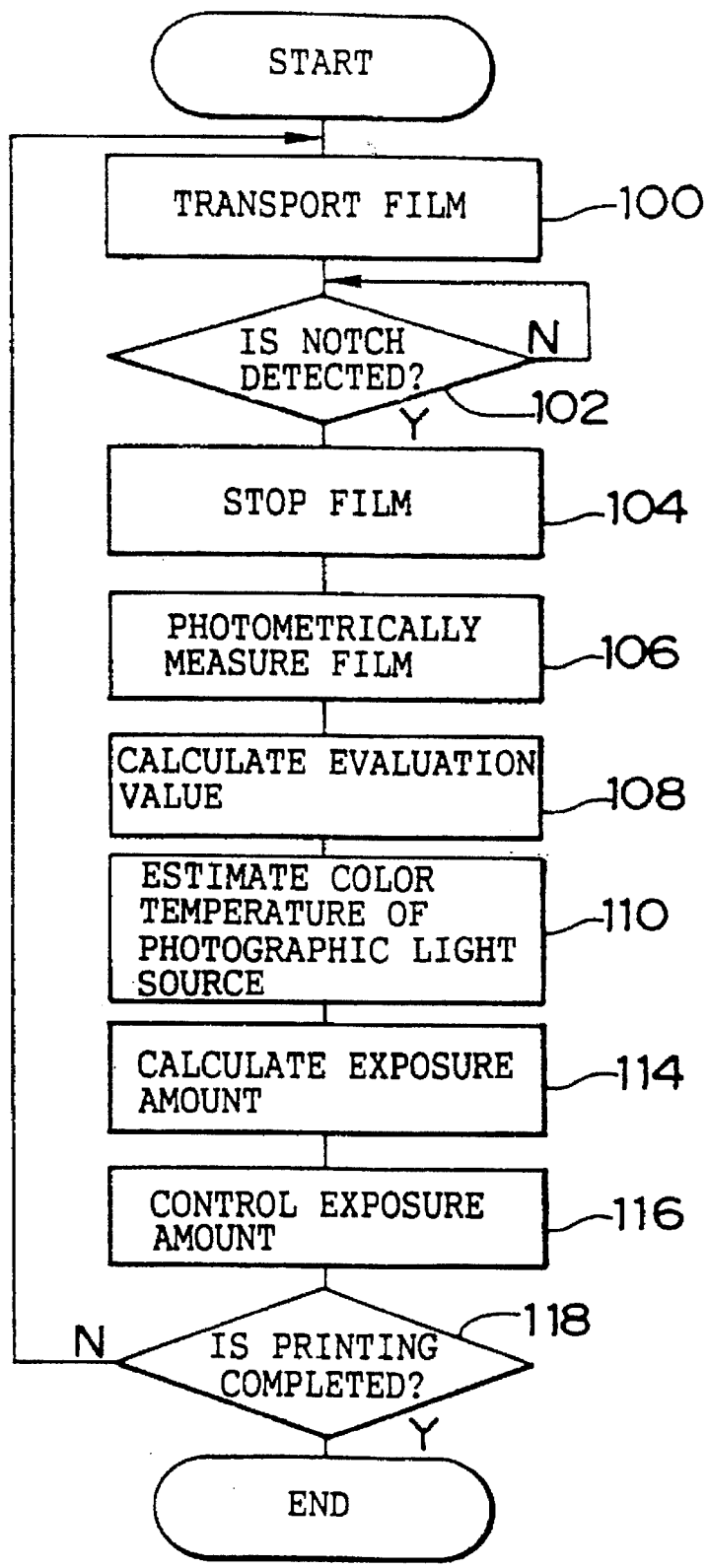
FIG. 1 is a flowchart showing an exposure control routine according to an embodiment of the present invention.

The principle and preferred embodiments of the present invention will next be described.

Generally, a sensor output (corresponding to the theoretical reference value in the claims) obtained when a subject, illuminated by natural daylight having a color temperature T, is photographed can be expressed by the following expression (2):

$$E_{ij}^T = \int P^T(\lambda) \, \rho_i(\lambda) S_j(\lambda) d\lambda \qquad (2)$$

where $E_{ij}^T$ is sensor output, $P^T(\lambda)$ is the spectral energy distribution of black body radiation of a color temperature T, $\rho_i(\lambda)$ is the spectral reflectance distribution of an i-th subject, and $S_j(\lambda)$ is the spectral sensitivity distribution of a j-th sensor.

"i" for $\rho_i(\lambda)$ representing the spectral reflectance distribution of the subject in the expression (2) is determined by the format of information used for obtaining data. Specifically, taking a photographic image obtained by photographing a subject as an example, information can be obtained from each of a plurality of pixels obtained as a result of dividing the photographed image in lengthwise and crosswise directions. Hence, $\rho_i(\lambda)$ represents the spectral reflectance distribution of part of a subject which corresponds to an i-th pixel.

Generally, "j" for $S_j(\lambda)$ representing the spectral sensitivity distribution of the sensor in the expression (2) is preferably 3 so as to correspond to the number of the three sensors. When the expression (2) is applied to a photographic film, the spectral sensitivity distribution $S_j(\lambda)$ of the sensor can be replaced with the spectral sensitivity distribution of the photographic film, and when the expression (2) is applied to an image pickup device such as a video camera, the spectral sensitivity distribution $S_j(\lambda)$ of the sensor can be replaced with the spectral sensitivity distribution of the sensor of the image pickup device.

If a sensor output ($E_{ij}^0$) recorded at an unknown color temperature $T^0$ is known, the color temperature at which the subject was recorded can be obtained as a color temperature which makes the following difference $\Delta E$ between the data $E_{ij}^0$ and sensor output $E_{ij}^T$ minimum.

$$\Delta E = \sum_{i=1}^{n} \sum_{j=1}^{3} (E_{ij}^0 - E_{ij}^T)^2 \qquad (3)$$

To execute the computation to minimize the difference $\Delta E$ in the above expression (3), it is necessary to formulate the unknown spectral reflectance $\rho_i(\lambda)$. It is known that the spectral reflectance $\rho_i(\lambda)$ can be represented by e.g., a weighted sum of eigen vectors, as shown in the following expression (4):

$$\rho_i(\lambda) = \sum_{k=1}^{3} a_k^i \cdot e_k(\lambda) \qquad (4)$$
$$= a_1^i \cdot e_1(\lambda) + a_2^i \cdot e_2(\lambda) + a_3^i \cdot e_3(\lambda)$$

where $e_k(\lambda)$ is an eigen vector and $a_k^i$ is a weighting coefficient (unknown number).

Figure 3:
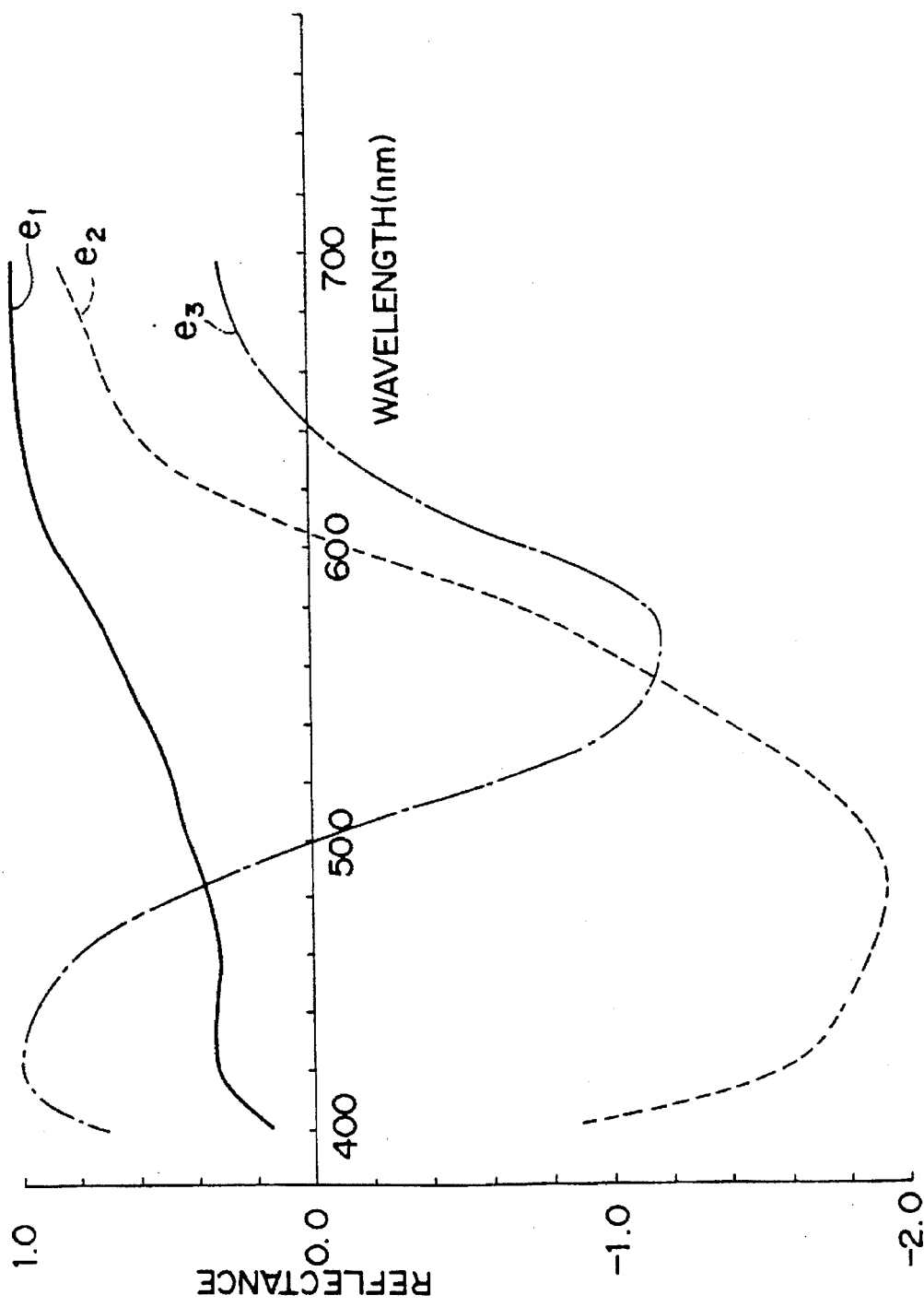
FIG. 3 is a graph showing the spectral distribution of the eigen vectors of a subject.
Figure 4:
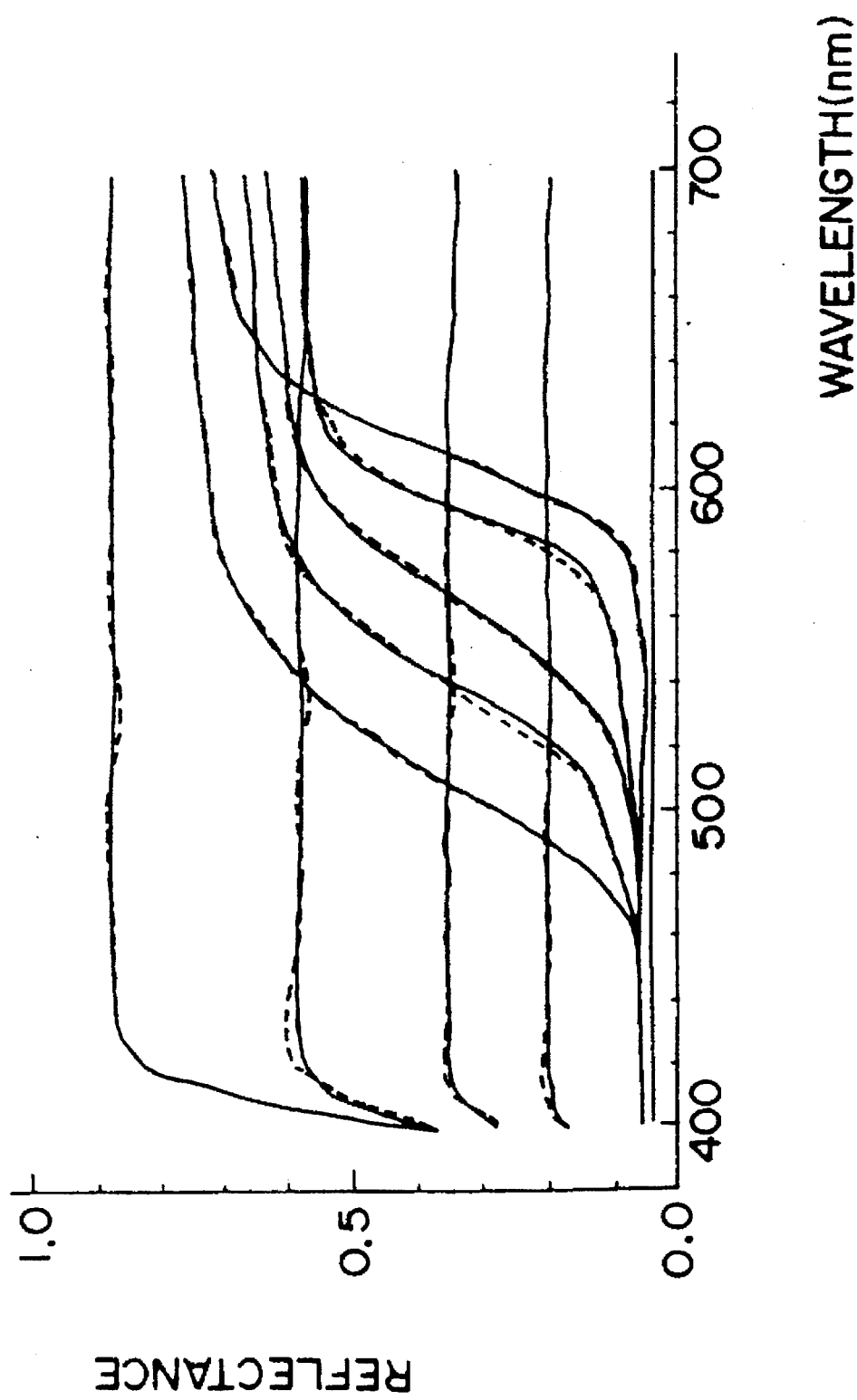
FIG. 4 is a graph showing characteristics which approximately represent the spectral reflectance of a subject by a weighted sum of the eigen vectors.

FIG. 3 shows eigen vectors $e_k(\lambda)$, and FIG. 4 shows spectral reflectances of a subject which are approximated by the weighted sum of eigen vectors. Twenty four colors of the Macbeth chart were used for this subject. In FIG. 4, solid-lines represent the spectral reflectance of the actual subject, whereas broken lines represent that of the subject approximated by the weighted sum of the eigen vectors. As can be seen from the drawings, the spectral reflectance of the subject can be represented by the weighted sum of the eigen vectors.

Therefore, the expression (2) can be converted to the following expression (5) by the use of the expression (4).

$$E_{ij}^T = P^T(\lambda)S_j(\lambda) \sum_{k=1}^{3} a_k^i \cdot e_k(\lambda)d\lambda \quad (5)$$

As a model computation, the present inventor minimized the difference ΔE in the expression (3) with respect to the case where 24 colors of the Macbeth chart were used for a subject (T°=5000K). The data $E_{ij}^o$ of this model computation were obtained from the expression (2) using actual spectral reflectance data. The sensor output $E_{ij}^T$ was calculated from the expression (5) by fixing the color temperature T and by providing the weighting coefficient $a_k^i$ with an initial value, because the color temperature T and the weighting coefficient $a_k^i$ were unknown. When the error ΔE was large, the initial value was corrected, and similar computation was carried out until the error converged. In other words, the expression which defines the spectral reflectance distribution was corrected by changing the coefficient so that the difference ΔE would become minimum.

Figure 5:
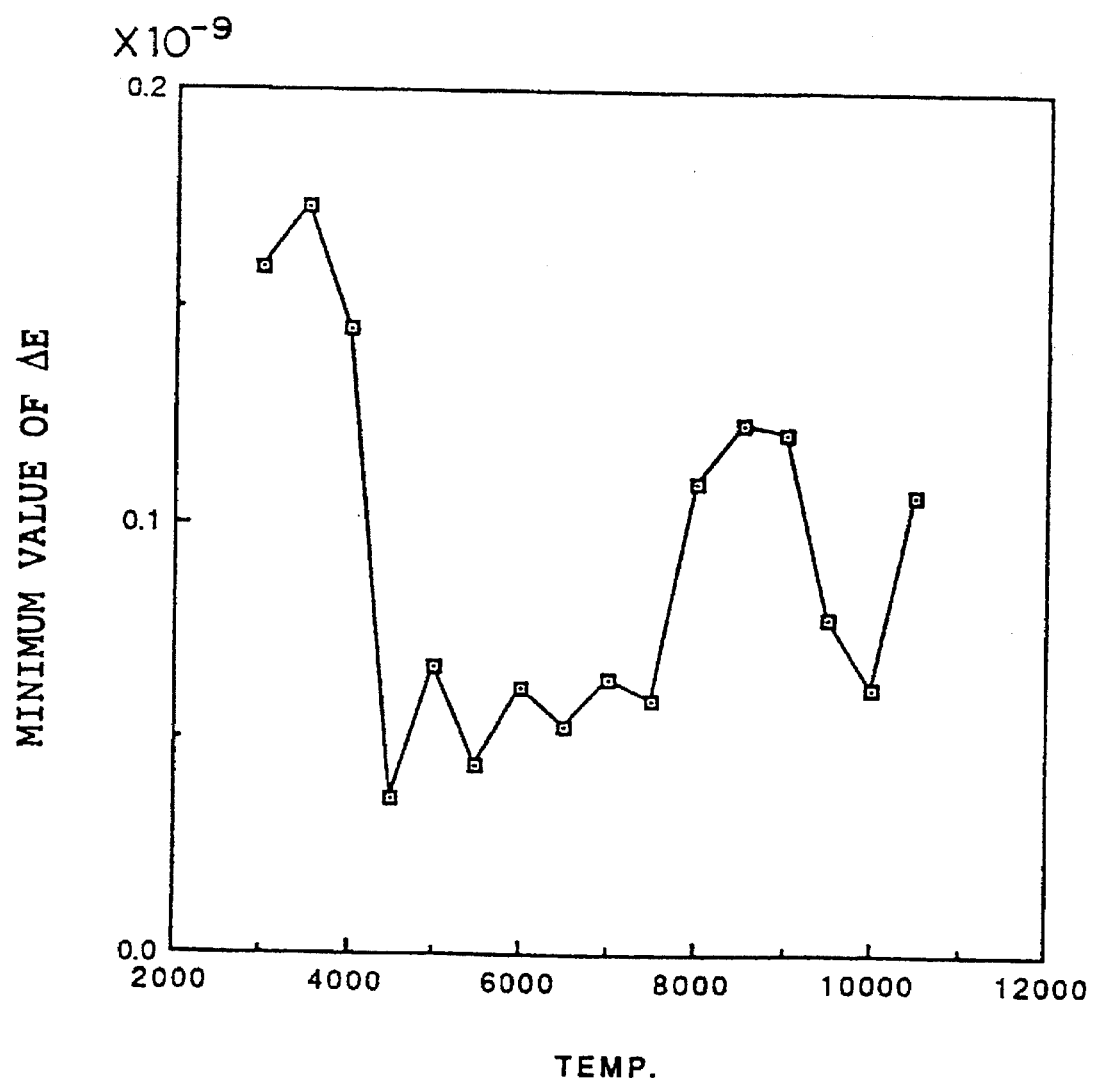
FIG. 5 is a graph showing the relationship between the color temperature and the minimum value of the difference $\Delta E$ represented by the expression (3)

FIG. 5 shows the results of the correction of the expression, in which the characteristics obtained when the color temperature was changed from 3000K. to 9000K. at intervals of 500K. are shown. The change of the color temperature substantially did not bring about the minimizing of the difference ΔE, and no specified relationship between the color temperature and the minimum value of the difference ΔE was found. Accordingly, it is understood that color temperatures are difficult to specify.

Figure 6:
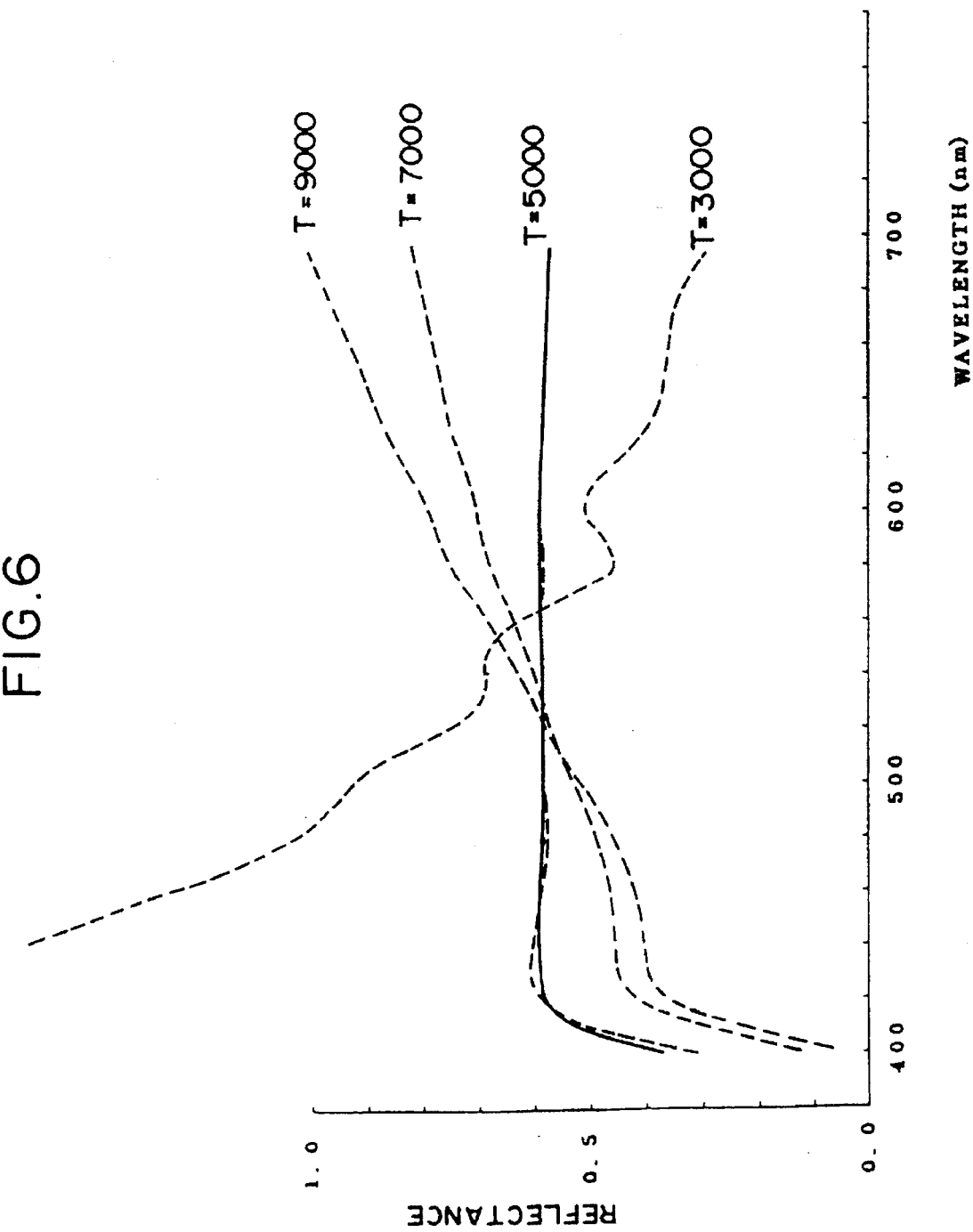
FIG. 6 is a graph showing the relationship between the color temperature and spectral reflectance for explaining a singular phenomenon occurred when the spectral reflectance of a subject is restored.

The present inventor noticed that a singular phenomenon occurred when the spectral reflectance of a subject was restored from the expression (4) by using weighting coefficients $a_k^i$ which provide the difference ΔE with the minimum value at respective color temperatures. Specifically, the inventor found that the thus obtained spectral reflectance data became negative or considerably exceeded 1.0 (see FIG. 6). It is considered that, when an attempt is made to minimize the difference ΔE, the spectral reflectance $\rho_i(\lambda)$ has an abnormal value so as to make a consistent computation.

The spectral reflectance does neither take a negative value nor exceed 1.0 ($0 \leq \rho_{iT}(\lambda) \leq 1$). Based on this fact, the present inventor conceived that this abnormal reflectance can be used for the estimation of a color temperature. In other words, by assuming that a color temperature deviates from the true color temperature dependently on an extent that the spectral reflectance $\rho_i(\lambda)$ exceeds 1.0, the inventor introduced the idea of an evaluation value V for estimating a color temperature shown in the following expression (6):

$$V = \sum_{i=1}^{n} (MAX[\rho_i(\lambda)] - 1.0) \quad (6)$$

When the value in the parenthesis is negative, the value is set to zero.

Figure 2:
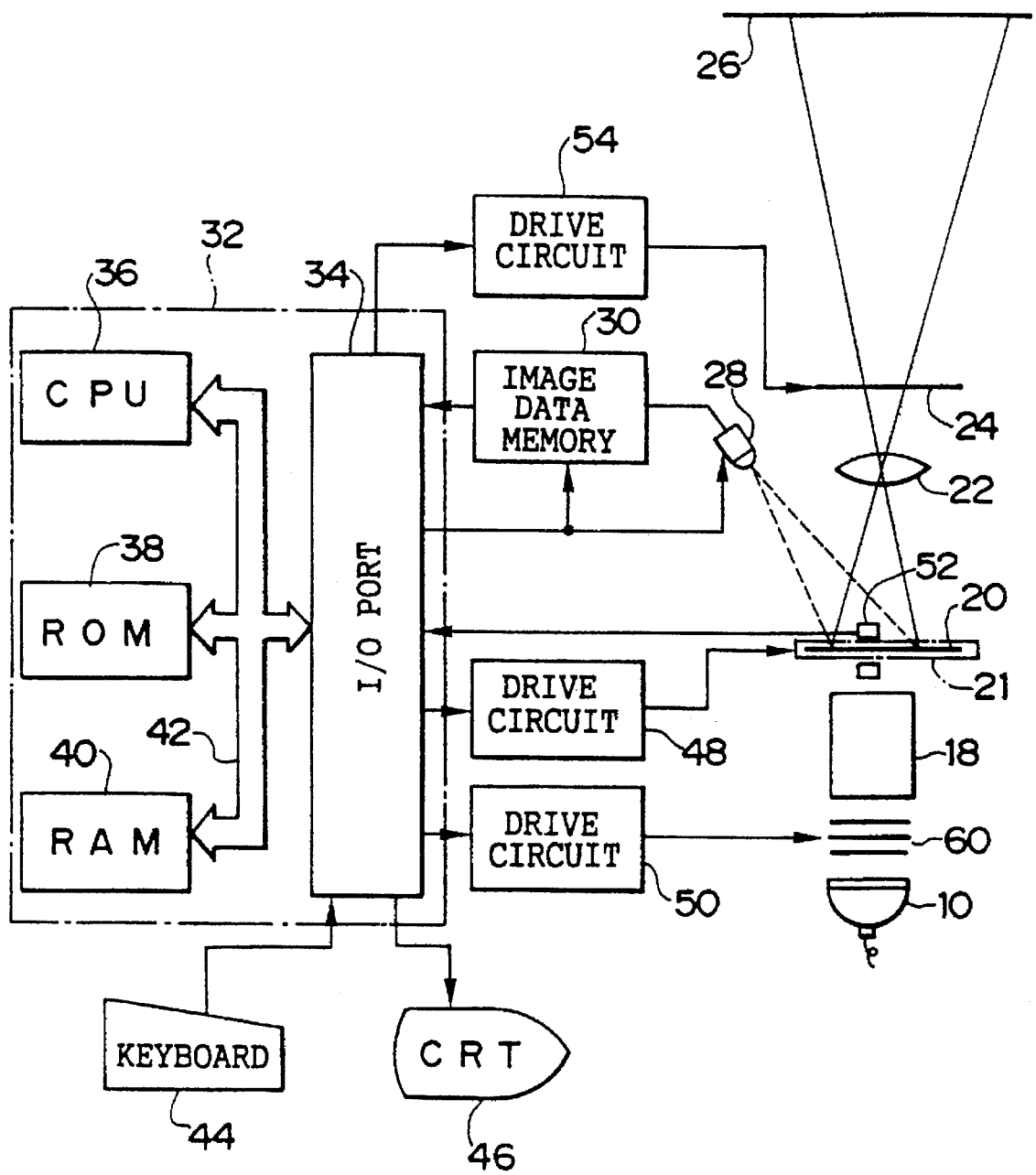
FIG. 2 is a schematic diagram of an automatic printer to which the present invention is applied.

The evaluation value V was plotted with respect to a plurality of predetermined color temperatures. As a result, a V-shape characteristic was obtained, as shown in FIG. 2. The color temperature corresponding to the bottom of V was 5000K, and this value matched the above-mentioned unknown color temperature T°. Thus, it is possible to estimate the color temperature.

Accordingly, there is obtained a theoretical reference value determined by summation or integration of a product of a spectral energy distribution of an object having a known color temperature, a spectral sensitivity distribution of a photometric system such as an image pickup system, and a spectral reflectance distribution represented by an expression (typically, a linear combination of three predetermined functions). At least part of light reflected from the light source subject to the estimation of color temperature is measured as a signal. The thus obtained theoretical value may be previously obtained and stored in a storage means such as a memory. As the spectral energy distribution of an object having a known color temperature, there are known a spectral energy distribution of black body radiation, a spectral energy distribution of an artificial light source such as an incandescent lamp or a fluorescent lamp. A spectral reflectance distribution which minimizes a difference between the theoretical reference value and a measured value is obtained for each of a plurality of color temperatures. A sum of abnormal components of the thus obtained spectral reflectance whose maximum values exceed 1.0 is obtained as an evaluation value for respective color temperatures. It is possible to estimate a color temperature corresponding to the minimum value of the evaluation values as the color temperature of the light source.

If it is assumed that an exposure time of a print is controlled based on the thus estimated color temperature when an image of the photographic film is printed on a sensitive print material which serves as a duplicating sensitive material, the spectral sensitivity distribution $S_j(\lambda)$ of the sensor may be replaced with the sensitivity distribution of a photographic film, for example, the sensitivity distribution of a color negative film as shown in FIG. 8. In this case, the sensor output value $E_{ij}^T$ of the above expression (2) corresponds to the color development density of the photographic film or the exposure amount of the film.

The spectral energy distribution of the light source for photometrically determining a color development density of the film and the spectral sensitivity distribution of the print sensitive material are previously determined. Thus, if a spectral transmission of a film which differs from film to film is determined, it becomes possible to obtain a density which is photometrically determined by a photometer having the same spectral sensitivity distribution as the sensitive print material. This technology is also disclosed in the method of estimating a spectral distribution of JP-A-4-310942.

As described above, the color temperature estimating method of the present invention makes it possible to estimate a color temperature corresponding to the minimum value among evaluation values as the actual color temperature of the photographic light source when an image subjected to estimation was photographed. This standard image signal may be previously obtained and stored in a storage means such as a memory.

If an exposure amount for printing an image of a photographic film on a sensitive print material is determined, on the basis of the thus estimated color temperature and photometric data, so that the image has the same gray as obtained at the estimated color temperature, it is possible to print the image with an optimum exposure amount which reflects the tints of the light source at the time of photographing.

Hereinafter, an embodiment of the present invention will be described in detail while referring to the appended drawings. In this embodiment, the present invention is applied to an automatic printer.

FIG. 2 shows a schematic diagram of an automatic printer which prints a photograph. A mirror box 18 and a lamp house 10 equipped with a halogen lamp are disposed below a color negative film 20 loaded in a negative carrier 21 and transferred to a printing section. A light-modulation filter 60 is interposed between the mirror box 18 and the lamp house 10. As is well known, the light-modulation filter 60 is made up of three filters, i.e., a yellow (Y) filter, a magenta (M) filter, and a cyan (C) filter.

A lens 22, a black shutter 24, and color paper 26 are disposed above the negative film 20, in order. Light emitted from the lamp house 10 and passed through the light-modulation filter 60, the mirror box 18 and the color negative film 20 forms an image on the color paper 26 by means of the lens 22.

A DX code which represents the type of color negative film is recorded along the edge of the color negative film 20, and notches are formed along both side edges of the film. To detect the DX code and the notches, a detector 52 composed of a light-emitting element and a light-receiving element is disposed in such a way that the side edges of the negative film 20 are sandwiched between these elements.

A photometer 28 is disposed at a position, in the direction inclined with respect to the optical axis of the above-described image-forming system, from which the density of the image of color negative film 20 can be measured. The photometer 28 is composed of three filters having respective central wavelengths of 450±5 nm, 550±5 nm, and 700±5 mm and respective half-widths of 15 to 50 nm and a two-dimensional imaging sensor. The light transmitted from the color negative film can be separated into 3 wavebands and measured by the photometer 28.

Figure 14:
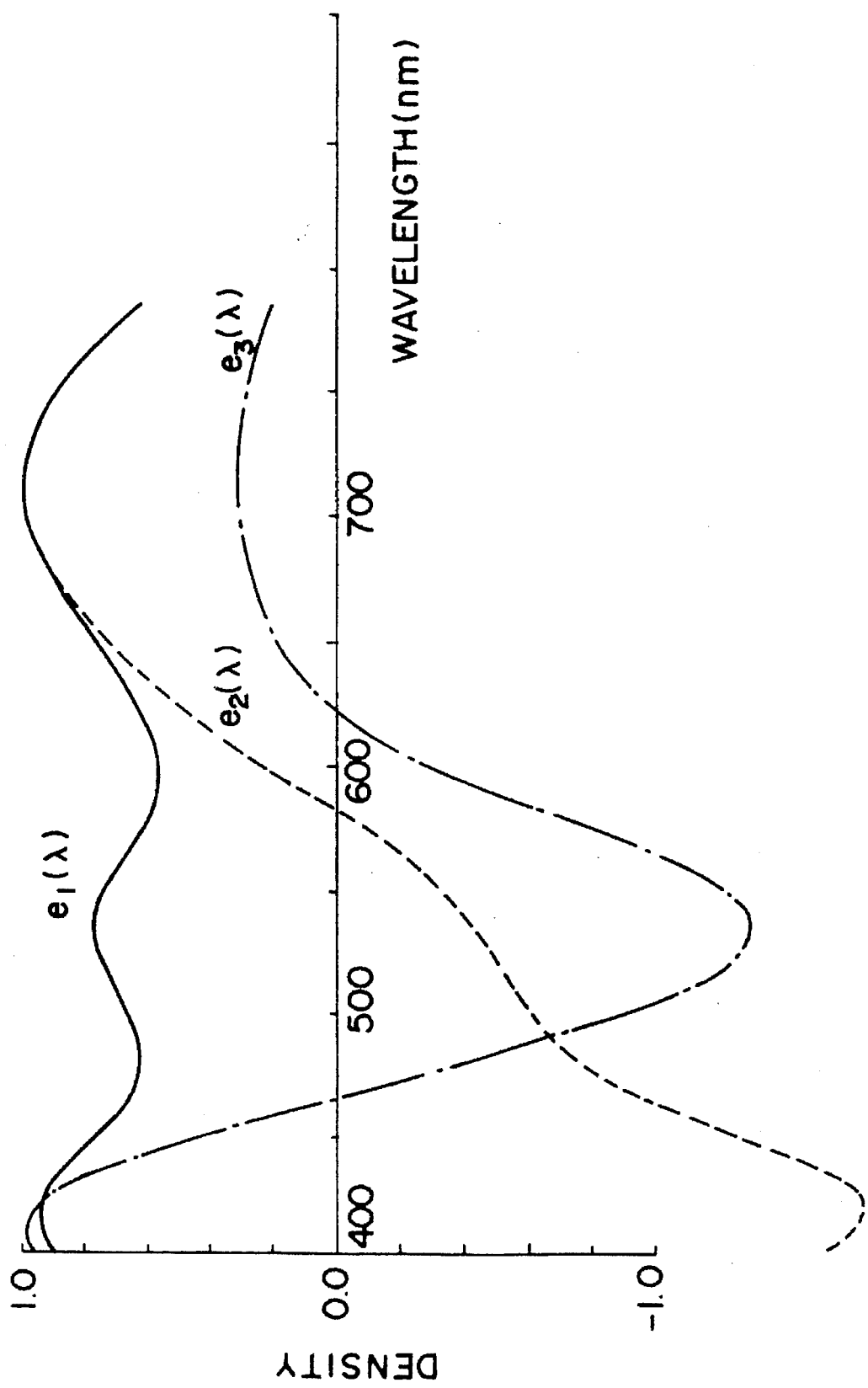
FIG. 14 is a graph showing the spectral distribution of eigen vectors of a color negative film.

A photometer 28 is connected to an exposure amount determining device 32, comprising a microcomputer via an image data memory 30 which stores image data photometrically determined by the photometer 28. The exposure amount determining device 32 has an I/O port 34, a central processing unit (CPU) 36, a read only memory (ROM) 38, a random access memory (RAM) 40, and a bus 42 such as a data bus or a control bus for connecting these elements with each other. An exposure control routine program which will be described later, and eigen vectors $e_1(\lambda)$, $e_2(\lambda)$, and $e_3(\lambda)$ of a color negative film shown in FIG. 14 are stored, for each type of film, in the ROM 38. Although FIG. 14 shows the distribution of an eigen vector for one type of film, it should be noted that a substantially similar distribution profile is obtained for other types of film. Moreover, in the ROM 38, there are previously stored a spectral energy distribution of the halogen lamp provided in the lamp house 10, a spectral sensitivity distribution of paper used in the printer, and three spectral sensitivity distributions of a photometer corresponding to transmission wavelength ranges of the three filters. In order to substitute paper for use with other paper, spectral sensitivity distributions of a plurality of types of paper may be previously stored in the ROM, and the spectral sensitivity distribution of paper to be used may be selected via a keyboard. Alternatively, a spectral sensitivity distribution profile of required paper which is stored in an external memory such as a floppy disk may be read into the RAM. Furthermore, a spectral energy distribution of a lamp may be changed when the halogen lamp is replaced. To this end, the spectral energy distribution of the lamp may be photometrically determined by the photometer 28 in a direct manner or through a filter and the thus determined spectral energy distribution may be stored in the memory, or the spectral energy distribution of the lamp may be constantly monitored and corrected using a specifically designed lamp monitoring sensor. In addition, the spectral sensitivity distribution of a color negative film (see FIG. 8), the spectral energy distribution of black body radiation, and the eigen vector of a subject (see FIG. 3) are stored in the ROM 38. The exposure amount determining device 32 is connected to the image data memory 30 so as to control the read and write timing of the image data memory 30 and to actuate the photometer 28. The I/O port 34 is connected to the negative carrier 21 via a drive circuit 48, to the light-modulation filter 60 via a drive circuit 50, and to the black shutter 24 via a drive circuit 54. The I/O port 34 is connected to a key board 44, the detector 52 and a CRT 46.

The exposure control routine previously stored in the ROM 38 of the exposure amount determining device 32 will now be described with reference to FIG. 1. When a start switch is turned on while the color negative film 20 is loaded in the negative carrier 21, the negative carrier 21 is actuated by the drive circuit 48 in step 100. As a result of this, the color negative film 20 is conveyed. While the color negative film 20 is being conveyed, the detector 52 reads the DX code and detects the notches. In subsequent step 102, it is judged whether or not the detector 52 detected the notches. If it is judged that the notches were detected, the conveying of the color negative film 20 is stopped in step 104, and a picture in a frame is stopped at the position for exposure and printing. In step 106, a transmission density of the negative film is photometrically determined by actuating the photometer 28. Since the photometer 28 is provided with three filters, the transmission density of the negative film is spectrally divided into three wavelength bands.

In subsequent step 108, the type of film is determined from the read DX code, and the spectral sensitivity distribution of the color negative film corresponding to the film of the identified type and the distributions of the three eigen vectors of the subject are read from the ROM. The previously mentioned evaluation value is obtained by the use of a value photometrically determined by the photometer 28, the spectral energy distribution of black body radiation, the distributions of the three eigen vectors read from the ROM, and the spectral sensitivity distribution of the color negative film.

In other words, the color temperature is changed by a predetermined color temperature (for example 1K), and the above expression (5) is calculated for each color temperature. In this expression (5), the spectral sensitivity distribution of a color negative film read from the ROM is used as the spectral sensitivity distribution $S_f(\lambda)$. The weighting coefficient $a^i_k$ which minimizes the difference $\Delta E$ is obtained by using the expression (3). A spectral reflectance is restored by the expression 4 using the thus obtained weighting coefficient $a^i_k$. The evaluation value V is obtained from the expression (6) using the thus restored spectral reflectance. The photometric value, obtained by the photometer 28, which is practically used as the sensor output is a transmission density of the negative film. Therefore, an exposure amount is calculated by a film density-exposure characteristic curve shown in FIG. 9, whereby a spectral reflectance is restored.

Figure 7:
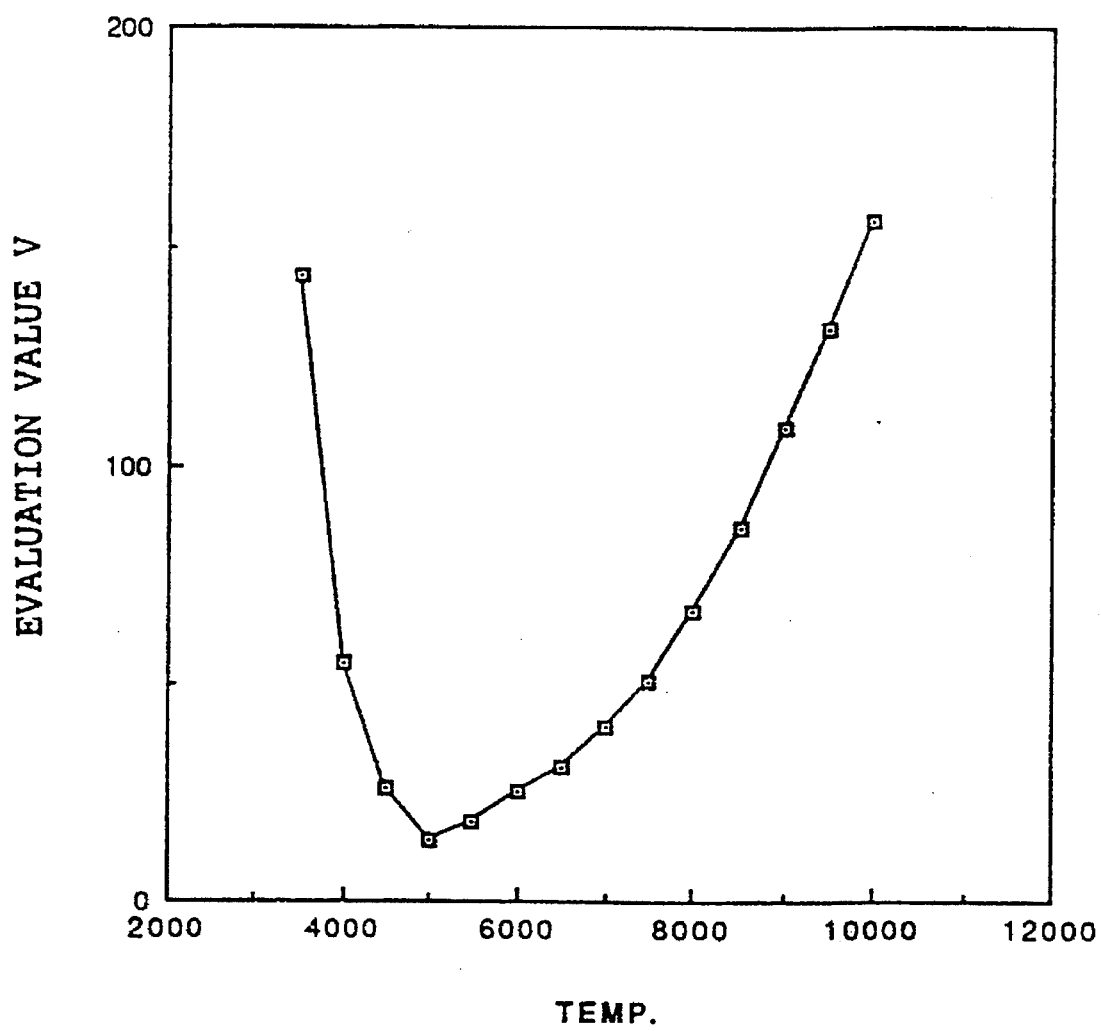
FIG. 7 is a graph showing the relationship between the color temperature and the evaluated value V represented by the expression (6) for 24 colors of the Macbeth chart.
Figure 11A:
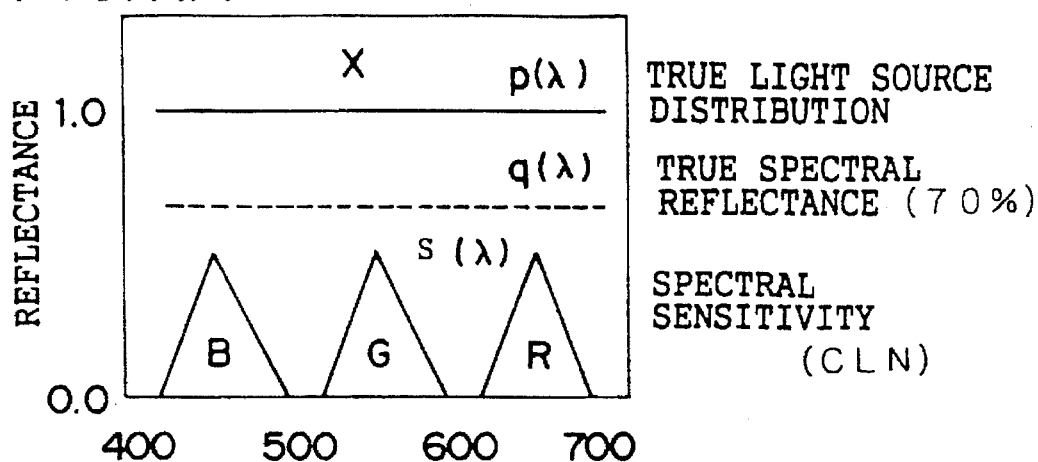
FIG. 11A shows the spectral sensitivity distribution of a film, the spectral energy distribution of a light source, and the spectral reflectance distribution of a subject.
Figure 11B:
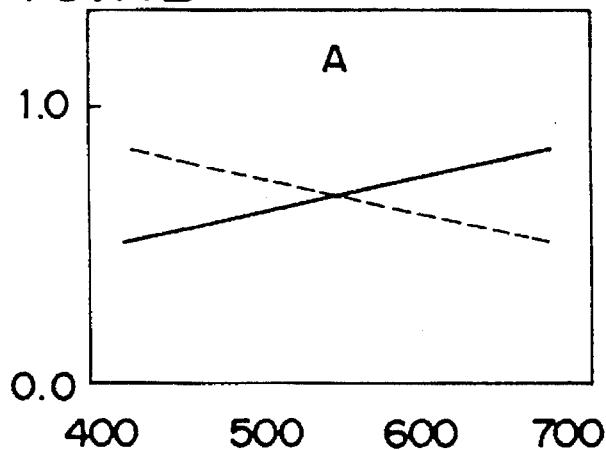
FIG. 11B shows an example of the spectral reflectance distribution obtained from exposure data.
Figure 11C:
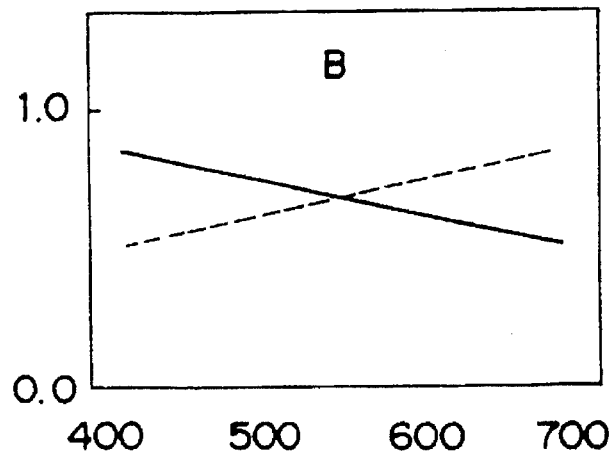
FIG. 11C shows another example of the spectral reflectance distribution obtained from the same exposure data as used in obtaining the spectral reflectance distribution shown in FIG. 11(B)

In step 110, as previously described, the color temperature at which the thus obtained evaluation value V becomes minimum is estimated as the color temperature of the light source. The thus estimated value matches with an actually measured value with high accuracy as shown in FIG. 7.

Figure 12:
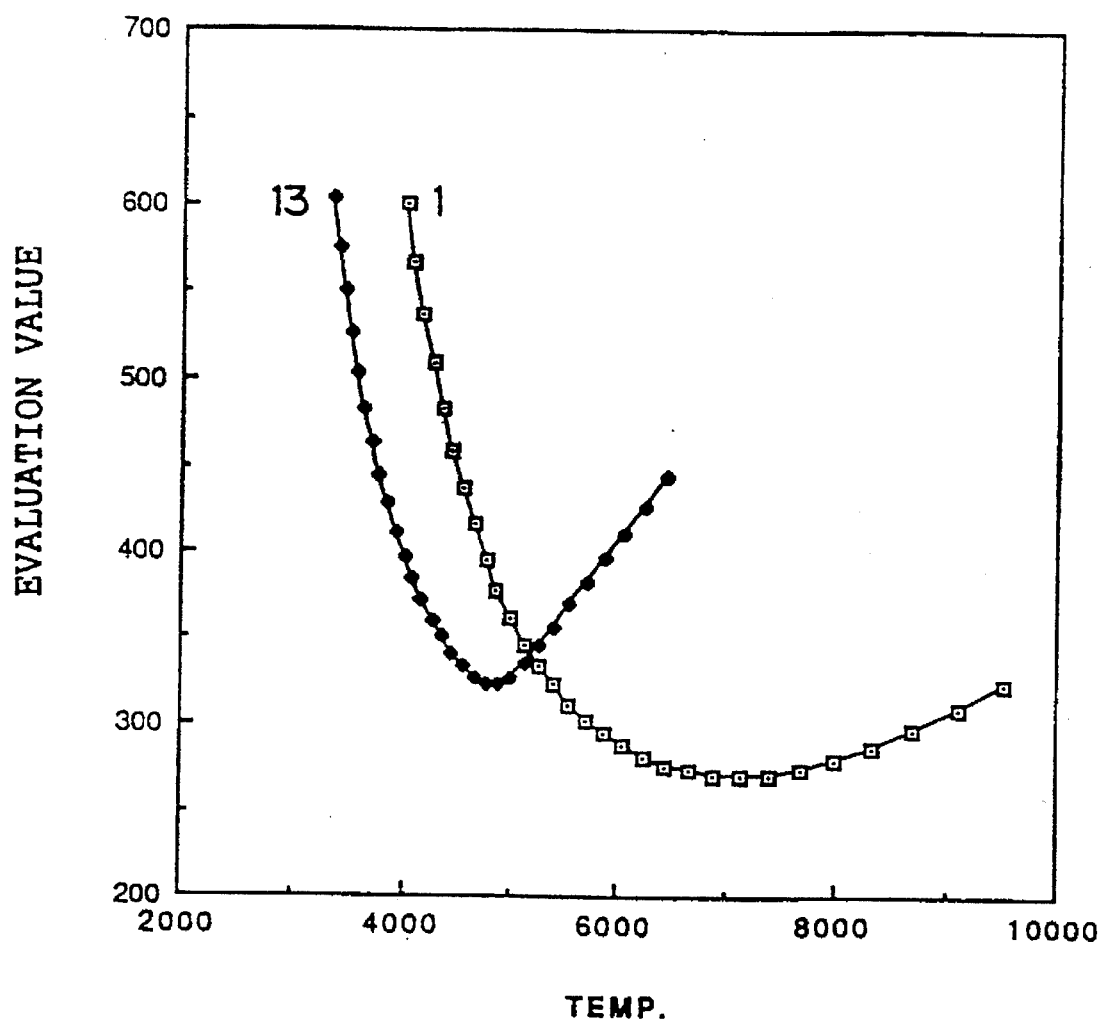
FIG. 12 is a graph showing the relationship between a color temperature and the evaluated value V represented by the expression (6), with respect to the results of practical photographing by using a color negative film.
Figure 13:
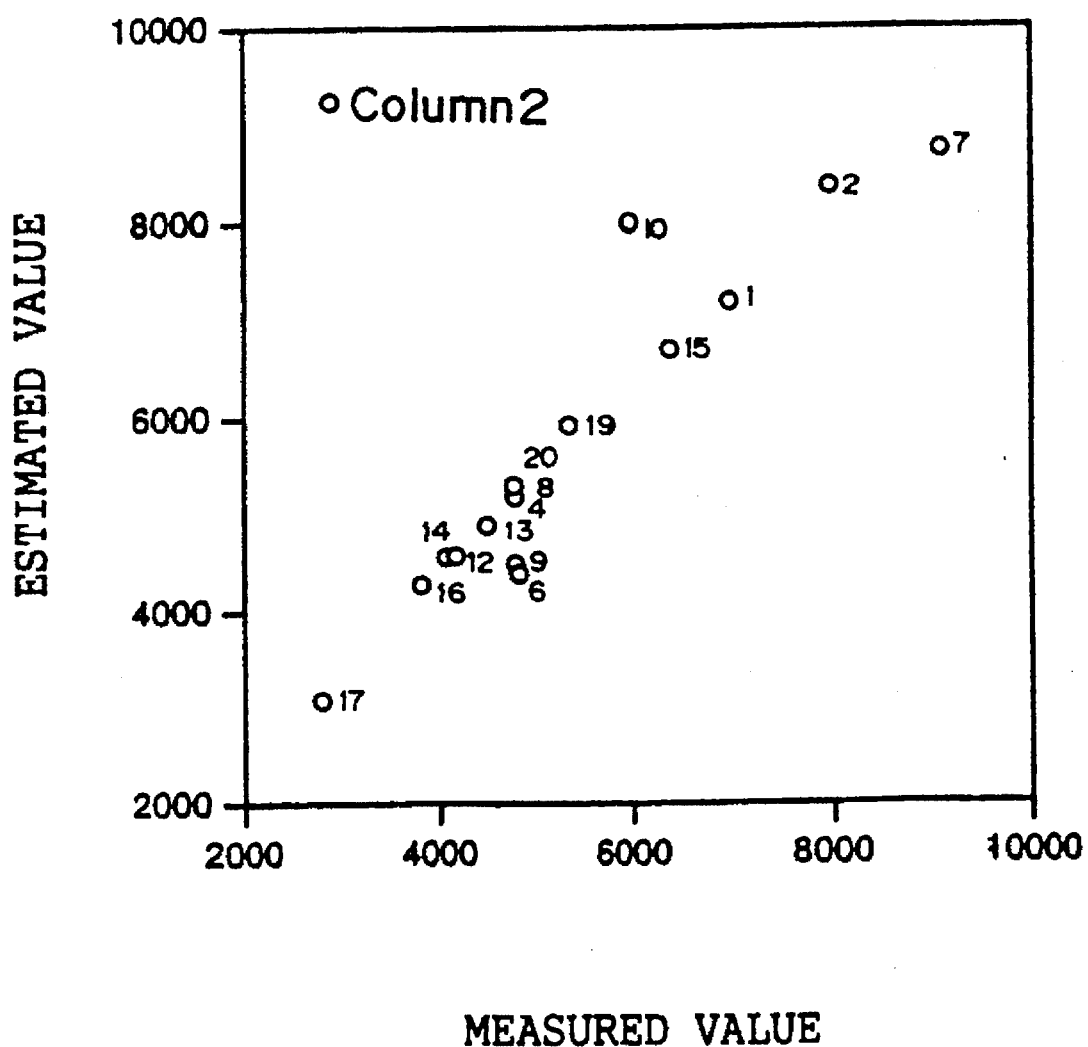
FIG. 13 is a graph showing the relationship between actually measured color temperatures and estimated color temperatures.

Other results obtained as a result of the estimation of color temperatures are shown in FIGS. 12 and 13. An experiment on the estimation of a color temperature was conducted with respect to a color negative film which was photographed at a plurality of different temperatures (21 temperatures) within the range of 3000K to 9000K. With the use of a density-exposure characteristic curve, an exposure amount was obtained from the density which was acquired by reading the picture in a frame using a scanner with an aperture of 100

µm. The thus obtained exposure amount was used as the sensor output data $E_{ij}^{0}$ employed in the experiment. Although the number of pixels was 230×340, they were thinned out to one fifth of the original number of pixels which would not result in practical problems. The difference ΔE of the expression (3) was minimized by using the thus obtained 46×68 pixels. FIG. 12 is a graph of the evaluation value V of the expression (6) obtained for two any pictures of frames of the color negative film. The minimum value can be determined from the curve corresponding to any one of the pictures. FIG. 13 is a graph of actually measured color temperatures and estimated color temperatures for all of the frame pictures of the color negative film. From this drawing, it can be seen that there is a high level of relevancy between the actually measured color temperatures and the estimated color temperatures.

The above description is given of the case where the spectral energy of black body radiation is used to obtain the evaluation value V. However, the present invention is not limited to this. The spectral energy distribution of a fluorescent lamp having a line spectrum, or other light sources, may be additionally used. In this case, when the weighting coefficient $a^i_k$ which minimizes the difference ΔE is obtained by using the expression (3), computation is executed by using the spectral energy distribution of a light source such as a fluorescent lamp, as shown in FIG. 10 in lieu of the spectral energy distribution of black body radiation. The spectral reflectance, which is restored by the expression (4) using the thus calculated weighting coefficient $a^i_k$, is also additionally utilized, whereby the minimum evaluation value V is obtained, from the spectral reflectance restored from the spectral energy distribution of black body radiation and the spectral reflectance restored from the spectral energy distribution of the light source such as a fluorescent lamp.

In step 114, an exposure amount is calculated on the basis of the color temperature of the light source estimated in step 110. An exposure control is executed based on the thus calculated exposure amount by controlling the light-modulation filter 60 in step 116. The amount of light modulation filtering necessary for carrying out the exposure control can be obtained according to, for example, a color correction filtering level calculation routine shown in FIG. 15. In this color correction filtering level calculation routine, logarithmic exposure amounts ($Ei^T$, $Ei^{55}$, i=B, G, R) are calculated at an estimated color temperature T and a standard color temperature of 5500K. Exposure differences for blue B and red R ($\Delta E_B = \Delta E_B^T - \Delta E_G^{55}$, $\Delta E_R = \Delta E_R^T - \Delta E_G^{55}$) with respect to green G at a color temperature T on the basis of those at the standard color temperature of 5500K. are obtained by using the logarithmic exposure amounts. In this way, correction filtering levels (Y, C) necessary for a gray balance are obtained.

Figure 15:
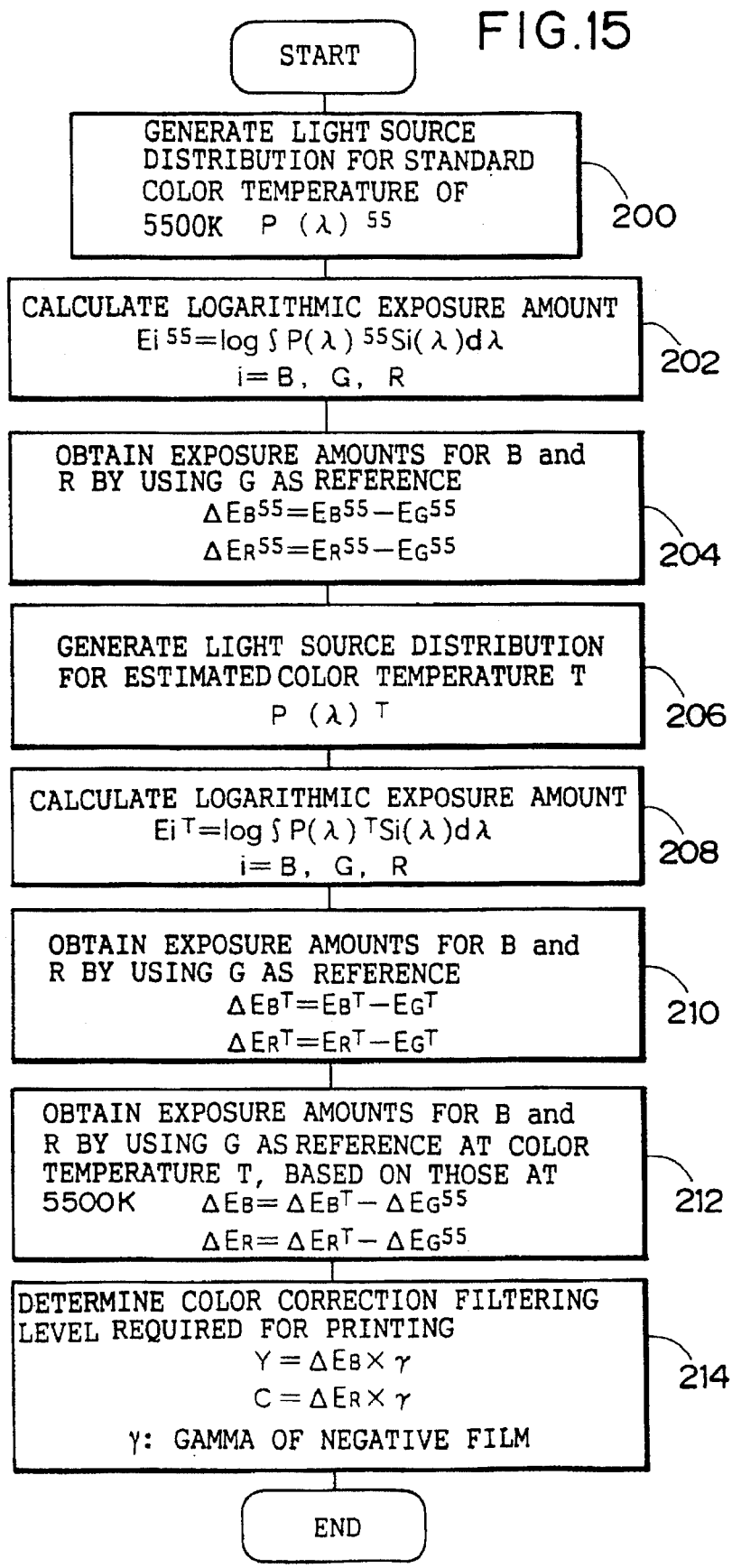
FIG. 15 is a flowchart showing the operation for computing the amount of light-modulation filtering.

In step 200 shown in FIG. 15, a light source distribution $P(\lambda)^{55}$ at a standard color temperature 5500K. is generated, and a logarithmic exposure amount ($Ei^{55}$=log $\int P(\lambda)^{55} Si(\lambda) d\lambda$, i=B, G, R) is calculated in subsequent step 202. In step 204, the exposure amount differences for B and R with respect to G, ($\Delta E_B^{55} = E_B^{55} - E_G^{55}$, $\Delta E_R^{55} = E_R^{55} - E_G^{55}$), are obtained. In subsequent step 206, a light source distribution $P(\lambda)^T$ at an estimated color temperature T is generated. In step 208, a logarithmic exposure amount ($Ei^T$=log $\int P(\lambda)^T Si(\lambda)d\lambda$, i=B, G, R) is calculated. In step 210, the exposure amount differences for B and R with respect to G, ($\Delta E_B^T = E_B^T - E_G^T$, $\Delta E_R^T = E_R^T - E_G^T$), are obtained. In step 212, the exposure amount differences for B and R with respect to G, ($\Delta E_B = \Delta E_B^T - \Delta E_G^{55}$, $\Delta E_R = \Delta E_R^T - \Delta E_G^{55}$) at an estimated color temperature T are obtained on the basis of those at the standard color temperature of 5500K. In step 214, a color correction filtering level (Y=$\Delta E_B \times \gamma$, C=$\Delta E_R \times \gamma$) necessary to give a gray balance at the time of printing is calculated by using gamma γ of the color negative film.

After completion of the exposure control of the light-modulation filter 60 at step 116, shown in FIG. 1, in step 118 it is judged whether or not the printing of all frame pictures is completed. If the printing is not completed, the processing returns to step 100 and the above-described steps are repeated. However, if the printing is completed, the routine is finished.

When an exposure amount is calculated by using the estimated color temperature, an exposure amount may be obtained so that gray of a picture of a frame will become gray obtained at the estimated color temperature.

$$\log Ej=Sj\{Cj(dj-dwj)+dwj\}+Kj, \quad (7)$$

where $$dj = Dj - NDj$$
$$dwj = \left( \sum_{j=1}^{3} dj \right)/3$$

j: any number from one to three which represents any one of R, G, and B,

Dj: a picture density of a picture of a frame of each film (e.g. a mean density of an overall picture), NDj: a mean image density of frames of a standard negative film or a plurality of films (e.g. a means image density of all pictures), Sj: a slope control value, Cj: a color correction value, Kj: a constant depending on characteristics of a printer, a film, and printing paper, and Ej: an exposure control value corresponding to the quantity of light used for printing.

The above described color correction value Cj, the constant Kj, and the slope control value Sj are changed according to an estimated color temperature of the light source. For example, these factors are changed in the manner described below.

When an estimated color temperature is low, the color correction value Cj of an image density, which changes coloration depending on a variation in color temperature, is set. The color correction value Cj is set in such a way that printing is carried out using a value at which correction defined by the color correction value Cj becomes low or negligible when an estimated color temperature is lower than a predetermined value. On the other hand, the color correction value Cj is set in such a way that the degree of color correction becomes higher when an estimated color temperature is high (for example, on a cloudy day or in the shade), and only the correction of the light source is carried out in the same manner as previously mentioned. In this way, as a result of carrying out the correction according to the color correction value, the print to be obtained will reflect the color of light which originally illuminated a subject, and hence it is possible to produce the print as originally expected at the time of taking the photograph.

Transmittance may be used instead of the transmission density which is employed in determining an exposure amount from the estimated color temperature. Both the transmittance and the transmission density are interchangeable, and hence the case where transmittance is used in lieu of the transmission density falls within the scope of the present invention.

In the above embodiment, if a system is modified to comprise a photometer means including a photometer 28 and an image data memory 30, and an exposure amount determining device 32, and this system executes the above mentioned exposure control routine as far as step 110, this system will function as a color temperature estimating apparatus which outputs the color temperature of the photographic light source as data.

This color temperature estimating apparatus is effective for use with a white balance control unit of a video camera. In other words, the use of this color temperature estimating apparatus makes a special reference medium such as a white board unnecessary, and makes it possible to specify the color temperature of the light source reliably and to constantly maintain color balance.

Although the above embodiment is directed to the case where the present invention is applied to an automatic printer, a photographing apparatus such as a camera may be provided with the above described color temperature estimating apparatus. In this case, an obtained color temperature of the light source may be recorded on a photographic film as color temperature data. The color temperature data recorded on a photographic film may be read in a copying apparatus such as a printer or a device having a display. Further, color temperature data may be recorded on a memory medium such as a magnetic tape or a memory card. In this case, it is possible to reproduce color temperature data from a recording medium in the copying apparatus.

What is claimed is:

1. A color temperature estimating apparatus, comprising:
   a memory for previously storing a theoretical reference sensor output value represented by summation or integration of a product of a spectral energy distribution of an object having a known color temperature, a spectral sensitivity distribution of a photometric system, and a spectral reflectance distribution defined by an expression;
   actual sensor output value acquiring means for acquiring an actual sensor output value by measuring at least a portion of light reflected from a body which is exposed to light emitted from a light source whose color temperature is to be estimated;
   spectral reflectance distribution computation means for calculating a spectral reflectance distribution for each of a plurality of color temperatures which makes a difference between said theoretical reference sensor output value and said actual sensor output value a minimum, to obtain plural spectral reflectance distributions;
   evaluation value computation means for calculating the sum of abnormal components of said obtained spectral reflectance distributions whose maximum values exceed 1.0 as an evaluation value, for each of said plurality of color temperatures, so as to obtain a plurality of evaluation values; and
   estimating means for estimating a color temperature corresponding to a minimum value of said plurality of evaluation values as the color temperature of said light source whose color temperature is to be estimated.

2. A color temperature estimating apparatus according to claim 1, wherein said expression which defines the spectral reflectance distribution is an expression represented by a linear combination of three predetermined functions.

3. A color temperature estimating apparatus according to claim 2, wherein said three predetermined functions involve eigen vectors.

4. A color temperature estimating apparatus according to claim 1, wherein said spectral reflectance distribution computation means calculate a spectral reflectance distribution for each of a plurality of predetermined color temperatures.

5. A color temperature estimating apparatus according to claim 1, wherein the spectral sensitivity distribution of said photometric system is the spectral sensitivity distribution of an image pickup system.

6. A color temperature estimating apparatus according to claim 1, wherein the spectral sensitivity distribution of said photometric system is the spectral sensitivity distribution of a photographic film.

7. A color temperature estimating apparatus according to claim 6, wherein spectral sensitivity distributions of a plurality of photographic films having different spectral sensitivities are stored in the memory.

8. A color temperature estimating apparatus according to claim 1, wherein the spectral energy distribution of the object having the known color temperature is the spectral energy distribution of black body radiation.

9. A color temperature estimating apparatus according to claim 1, wherein the spectral energy distribution of the object having the known color temperature is the spectral energy distribution of an artificial light source.

10. A color temperature estimating method, comprising the steps of:
    obtaining a theoretical reference sensor output value represented by summation or integration of the product of a spectral energy distribution of an object having a known color temperature, a spectral sensitivity distribution of a photometric system, and a spectral reflectance distribution defined by an expression;
    acquiring an actual sensor output value by measuring at least a portion of light reflected from a body which is exposed to light emitted from a light source whose color temperature is to be estimated;
    calculating a spectral reflectance distribution for each of a plurality of color temperatures such that a difference between said theoretical reference sensor output value and said actual sensor output value becomes a minimum, to obtain plural spectral reflectance distributions;
    calculating the sum of abnormal components of said obtained spectral reflectance distributions whose maximum values exceed 1.0 as an evaluation value, for each of said plurality of color temperatures, so as to obtain a plurality of evaluation values; and
    estimating a color temperature corresponding to a minimum value of said plurality of evaluation values as the color temperature of said light source whose color temperature is to be estimated.

11. A color temperature estimating method according to claim 10, wherein said expression which defines the spectral reflectance distribution is an expression represented by a linear combination of three predetermined functions.

12. A color temperature estimating method according to claim 10, wherein said theoretical reference sensor output value is previously stored in a memory.

13. A color temperature estimating method according to claim 10, wherein, among an evaluation value obtained by utilizing the spectral energy distribution of black body radiation, as the spectral energy of an object having the known color temperature, and an evaluation value obtained by utilizing the spectral energy distribution of an artificial light source, as the spectral energy of the object having the known spectral distribution, a color temperature corresponding to the minimum evaluation value is estimated as the color temperature of the light source whose color temperature is to be estimated.

14. A photographing apparatus having a color temperature estimating apparatus which comprises:

a memory for previously storing a theoretical reference sensor output value represented by summation or integration of the product of a spectral energy distribution of an object having a known color temperature, a spectral sensitivity distribution of a photometric system, and a spectral reflectance distribution defined by an expression;

actual sensor output value acquiring means for acquiring an actual sensor output value by measuring at least a portion of light reflected from a body which is exposed to light emitted from a light source whose color temperature is to be estimated;

spectral reflectance distribution computation means for calculating a spectral reflectance distribution for each of a plurality of color temperatures which makes a difference between said theoretical reference sensor output value and said actual sensor output value a minimum, to obtain plural spectral reflectance distributions;

evaluation value computation means for calculating the sum of abnormal components of said obtained spectral reflectance distributions whose maximum values exceed 1.0 as an evaluation value, for each of said plurality of color temperatures, so as to obtain a plurality of evaluation values; and estimating means for estimating a color temperature corresponding to a minimum value of said plurality of evaluation values as the color temperature of said light source whose color temperature is to be estimated.

15. A photographing apparatus according to claim 14, wherein the photographing apparatus is a photographic camera.

16. A photographing apparatus according to claim 14, wherein the photographing apparatus is a video camera.

17. A photographing apparatus according to claim 14, further comprising:

a recorder for recording an estimated color temperature on a photographic film.

18. An exposure amount determining method, comprising the steps of:

obtaining a theoretical reference sensor output value represented by summation or integration of the product of a spectral energy distribution of an object having a known color temperature, a spectral sensitivity distribution of a photometric system, and a spectral reflectance distribution defined by an expression;

acquiring an actual sensor output value by measuring at least a portion of light reflected from a body which is exposed to light emitted from a light source whose color temperature is to be estimated;

calculating a spectral reflectance distribution for each of a plurality of color temperatures such that the difference between said theoretical reference sensor output value and said actual sensor output value becomes a minimum, to obtain plural spectral reflectance distributions;

calculating the sum of abnormal components of said obtained spectral reflectance distributions whose maximum values exceed 1.0 as an evaluation value, for each of said plurality of color temperatures, so as to obtain a plurality of evaluation values;

estimating a color temperature corresponding to a minimum value of said plurality of evaluation values as the color temperature of said light source subject to color temperature estimation; and determining an amount of exposure used for printing an image of a photographic film on a photosensitive material, on the basis of an estimated color temperature and the photometric data such that the gray of the image becomes identical to the gray obtained at the estimated color temperature.

19. An exposure amount determining method according to claim 18, wherein the theoretical reference sensor output value is previously stored.

20. An exposure amount determining apparatus, comprising:

a memory for previously storing a theoretical reference sensor output value represented by summation or integration of the product of a spectral energy distribution of an object having a known color temperature, a spectral sensitivity distribution of a photometric system, and a spectral reflectance distribution defined by an expression;

actual sensor output value acquiring means for acquiring an actual sensor output value by measuring at least a portion of light reflected from a body which is exposed to light emitted from a light source whose color temperature is to be estimated;

spectral reflectance distribution computation means for calculating a spectral reflectance distribution for each of a plurality of color temperatures which makes a difference between said theoretical reference sensor output value and said actual sensor output value a minimum, to obtain plural spectral reflectance distributions;

evaluation value computation means for calculating the sum of abnormal components of said obtained spectral reflectance distributions whose maximum values exceed 1.0 as an evaluation value, for each of said plurality of color temperatures, so as to obtain a plurality of evaluation values;

estimating means for estimating a color temperature corresponding to a minimum value of said evaluation values as the color temperature of said light source whose color temperature is to be estimated; and exposure amount determining means for determining an amount of exposure used for printing an image of a photographic film on a photosensitive material, on the basis of an estimated color temperature and the photometric data such that the gray of the image becomes identical to the gray obtained at the estimated color temperature.

* * * * *